Figure 1:
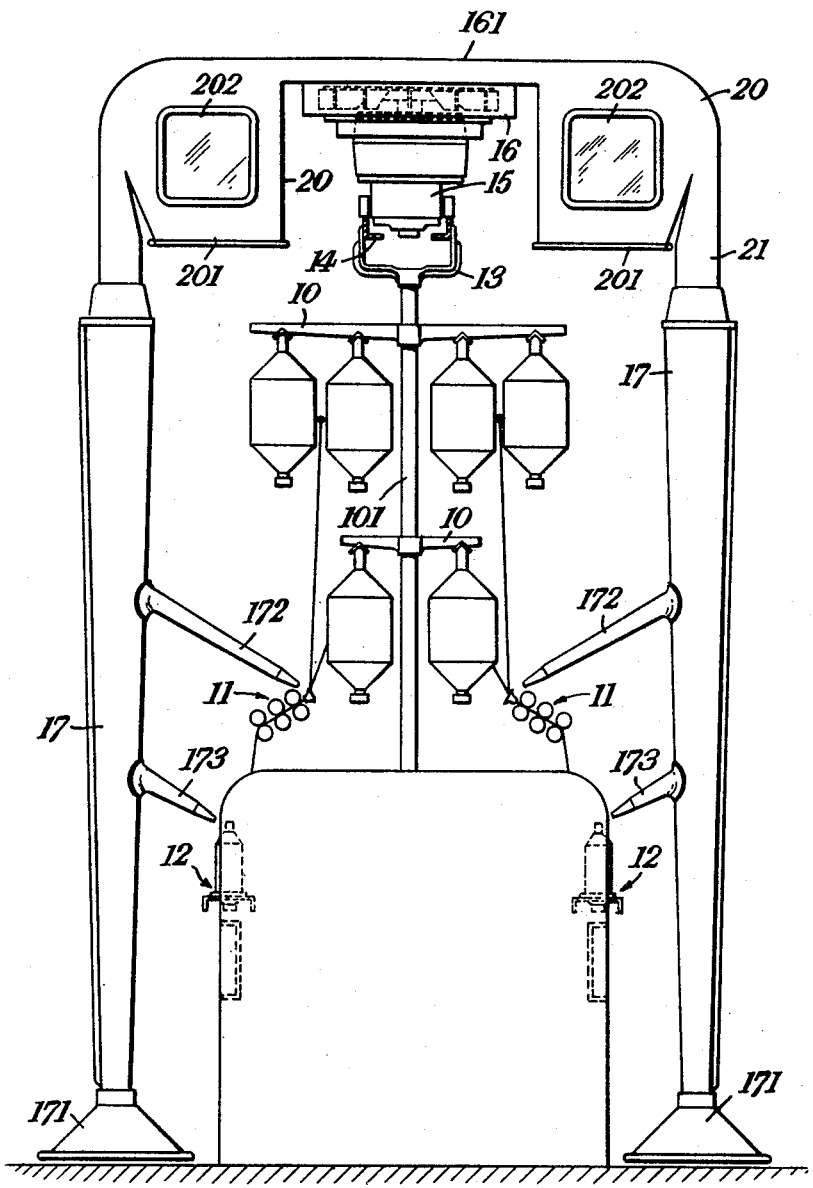

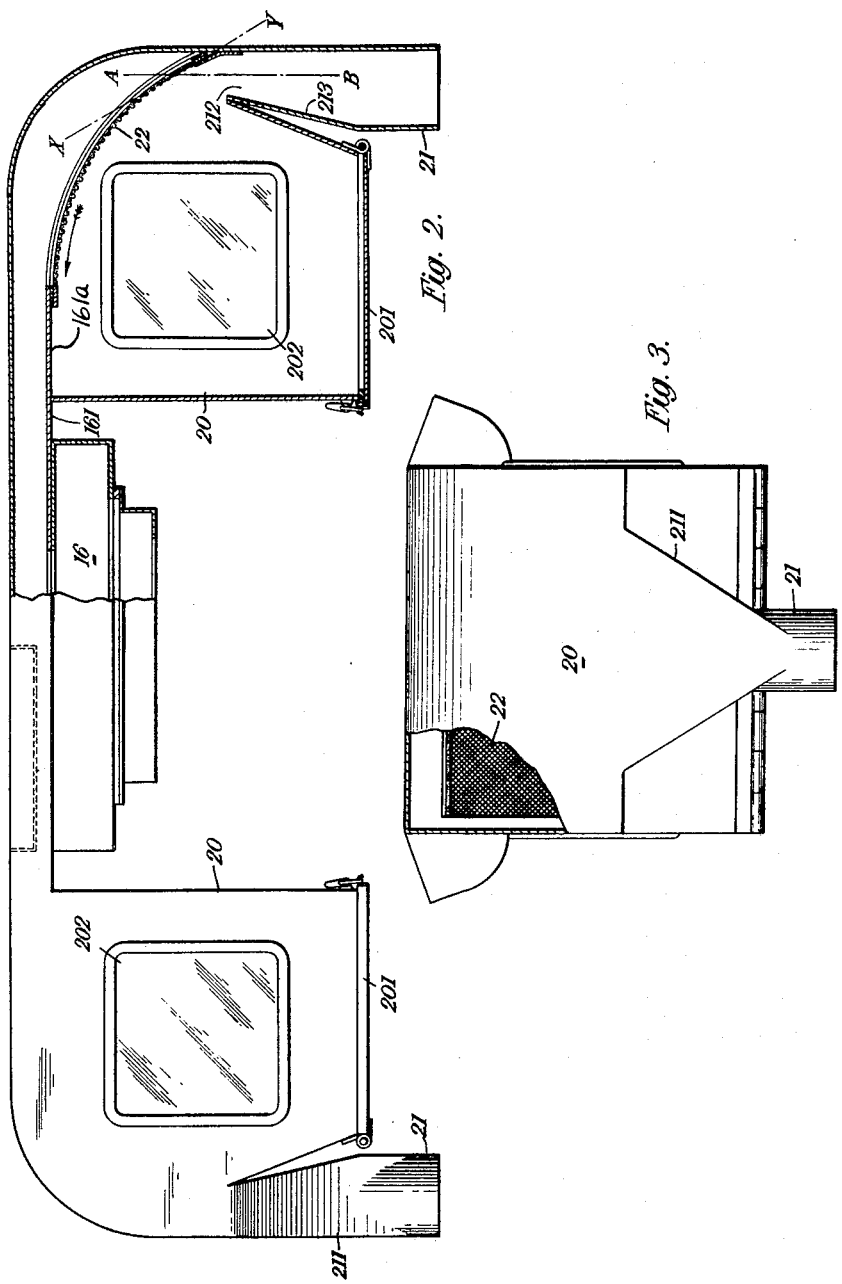

United States Patent Office 3,225,378
Patented Dec. 28, 1965

3,225,378
TRAVELLING APPARATUS FOR CLEANING MACHINE AND FLOOR SURFACES IN MANUFACTURING PLANTS
Roy Bottomley, 135 Manchester Road, Greenfield, near Oldham, England; Robert Greenwood, 83 Broadway, Helmshore, Rossendale, England; James Aubrey Wild, 36 Mountain Ash, Rochdale, England; and Raymond Kelly, 13 Rhyl St., Bolton, England
Filed Sept. 18, 1963, Ser. No. 309,621
Claims priority, application Great Britain, Sept. 21, 1962, 36,050/62
4 Claims. (Cl. 15—312)

The invention is concerned with travelling apparatus for cleaning machine, ceiling and floor surfaces in manufacturing plants, of the type (of which an example is disclosed in United States Patents Nos. 3,011,202 and 3,011,925) wherein a motor-driven carriage is caused to traverse a track suspended above the surfaces to be cleaned, said carriage supporting a motor-driven suction fan of which the input is connected to one or more depending flexible tubes which have intake nozzles by which dust, lint or the like present on said surfaces is inspired to be filtered and stored in a container mounted on the carriage. Such apparatus may incorporate means such as that disclosed in United States Patent No. 2,524,797 for blowing air currents over the surfaces of the machine and/or floor to displace dust or the like present thereon towards the suction nozzles.

The invention provides in travelling cleaning apparatus of said type a form of filter screen and a constructional arrangement of the suction duct leading thereto from the intake nozzle or nozzles, whereby the airstream is caused to impinge upon the screen in such manner as to be effective to clear the latter of the separated material so that the latter may fall by gravity into an associated storage receiver.

Further according to the invention, the filter screen is housed in a separator chamber on the suction side of the fan, to which chamber dust or the like is conveyed by suction from the cleaned surfaces by an intake duct having an entry aperture into said chamber which is so disposed in relation to the screen surface that at all points of the latter the airstream impinges thereon at an angle such that the force of the airstream has a major component tending to displace material collected on the screen surface, counteracting any tendency of such material to penetrate the screen mesh and thereby clog the same.

The efficiency of the screen as a filtering medium and the avoidance of clogging its mesh are enhanced markedly by a construction of the filter chamber inlet whereby the airstream velocity is reduced progressively between the points of its entry into said chamber and its impingement on the filter screen. This effect may be achieved by broadening the inlet passage from a comparatively narrow cylindrical bore at its attachment to the flexible intake sleeve to a rectangular orifice through which the airstream issues into the chamber.

A preferred embodiment of the invention is hereinafter more fully described with reference to the illustration contained in the accompanying drawings of an improved travelling cleaning apparatus for a double-sided textile spinning machine. In said drawings, FIG. 1 is an end elevation of a textile spinning machine illustrating generally the manner in which the cleaning apparatus of the present invention is mounted and arranged to operate theron. FIG. 2 is a partly sectional elevation of the travelling cleaning apparatus shown separately, as viewed in FIG. 1 but drawn to a larger scale, and FIG. 3 is a side elevation thereof.

The machine shown in FIG. 1 is a conventional spinning machine comprising at each side a creel 10, a drafting apparatus 11 and a ring spinning unit 12. Mounted on central columns 101 of the creel are brackets 13 carrying a rail track 14 extending longitudinally of the machine, for supporting a motor-driven carriage 15 which carries a motor-driven suction fan 16 of which an input conduit or branch 161 at each side is connected to a depending flexible tube 17. An intake nozzle 171 at the extremity of said tube 17 sweeps the floor adjacent the machine as the carriage 15 traverses said track 14, so that dust, lint or the like present on the floor in the swept region is inspired by the fan through the tube 17 to be filtered and separated from the airstream in the manner hereinafter described. Other nozzles 172 and 173 are disposed opposite the drafting apparatus 11 and the spinning units 12 for collecting dust and lint in the regions where it is generated. The track 14 is conveniently extended to pass continuously over a number of aligned machines and it may be arranged either in closed loop formation so that the apparatus traverses constantly in the same direction, or in discontinuous formation requiring the reversal of the apparatus at each end thereof.

Mounted upon the carriage and connected to each branch 161 is a separator chamber 20 having a short cylindrical inlet duct 21 to which the upper end of the flexible tube 17 is clipped. Extending across the full width of the interior of said chamber, so as to separate said inlet duct 21 from the branch 161 is a filter or screen 22. The input branch has a lower wall portion 161a extending partially over the separator chamber and terminating in spaced relation from the inlet duct 21. As shown in FIGURE 2, the filter 22 is so positioned as to serve as an extension of the lower wall portion 161a of input branch 161 and extends generally toward the inlet duct 21 and overlies the same. As illustrated, the filter 22 consists of a sheet of fine-gauge woven wire or other mesh, the arrangement being such that the airstream inspired through the tube 17 must pass through the screen 22 before entering the suction branch 161 of the fan. Airborne dust, lint or the like is filtered out of the airstream by the screen 22 and is allowed to fall by gravity into the base of the separator chamber 20, where it is stored temporarily and subsequently removed manually through the hinged door 201. Inspection windows 202 are provided in the sides of the chamber.

Alternatively, the separated dust or the like may be discharged from the separator chamber 20 by mechanical or other means which forms no part of the present invention.

It will be seen that the screen 22 presents a concave curved surface to the incoming dirt-laden airstream incident thereupon, and the shape and disposition of the screen in relation to the position of the point of entry of the airstream into the chamber 20, and the direction of the airstream at that point, are such that the airstream is caused to impinge against the screen surface at an angle of 30° to the tangent of the surface at the point of impingement.

In an ideal construction the screen 22 is shaped so that the aforesaid condition is fulfilled wherever may be the point at which the airstream impinges on the screen surface, and for this purpose a screen of parabolic cross-section may be used. It is however found that satisfactory results are obtained from a screen such as that shown in FIG. 2, which conforms in section to a circular arc, the arrangement being such that with the airstream entering the chamber 20 at a position near to one edge of the screen, the centre-line AB of the airstream is inclined at an angle of 30° to the tangent (represented by the line XY) of the screen surface where the line AB intersects the latter.

The cylindrical part 21 of the inlet duct merges into a section 211 which is of rectangular cross-section and which is flared or broadened as shown in FIG. 2 so as to cause the airstream to be decelerated by pressure drop before it encounters the surface of the screen 22. The sides of the section 211 incline towards the respective sides of the chamber 20, and a throat 212 is formed by an inclined inner wall 213, the effect being to convert the circular-section airstream entering the part 21 to a sheet of rectangular cross-section which sweeps across the full width of the screen in the direction of the arc, as indicated by the arrow (FIG. 2).

By these means lint and dust collected from the surfaces of the machine and from the floor of the spinning room by the nozzles of the tube 17 are swept by the airstream across the screen surface in such manner that the latter is maintained clear of the separated material which is allowed to fall by gravity into the base of the chamber, permitting the airstream to flow to the fan suction inlet 161 without substantial impedance.

If desired, the cleaned air entering the fan 16 from the filter chamber 20 may be expelled under pressure through tubes or jet nozzles arranged to direct blasts of air upon the surfaces of the machine to assist the cleaning operation, in accordance with the invention described in United States Patent No. 2,524,797, and/or upon the ceiling and structures depending therefrom.

In the drawings and specification there has been set forth a preferred embodiment of the invention and, although specific terms are employed, they are used in a generic and descriptive sense only, and not for purposes of limitation, the scope of the invention being defined in the claims.

We claim:

1. In a traveling suction cleaning apparatus including an overhead track-mounted suction fan adapted to travel over textile machines, said fan having a suction inlet, and a suction tube extending downwardly from said fan for sucking lint and other light material from floor surfaces; the combination therewith of an input conduit communicating with said inlet, a separator chamber communicating with said input conduit, an inlet duct communicatively connecting said suction tube to said chamber at a location above the bottom of the chamber, said input conduit having a lower wall portion extending partially over and forming a portion of the top wall of said chamber and terminating in spaced relation from said inlet duct, a filter within and extending across the upper portion of said chamber in the path of communication of the flow of air through the chamber from said suction tube into said input conduit, said filter serving as an extension of said lower wall portion of said input conduit and extending generally toward said inlet duct and being positioned relative to said inlet duct to receive the flow of air therefrom at such an angle that the air moves across the lower face of the filter in a sweeping-like manner so that lint and other light material will gravitate into said chamber and thus aid in preventing the filter from becoming clogged with the lint and interfering with the flow of air into and through said suction tube.

2. A structure according to claim 1, in which said filter curves upwardly from said inlet duct to said lower wall portion of said input conduit and extends at an angle of approximately 30° with respect to the direction of flow of air as it flows into said chamber and initially impinges against said filter.

3. A structure according to claim 1, wherein said inlet duct comprises an upwardly flared portion of substantially greater area at its upper end than at its lower end for effecting a progressive reduction in airstream velocity between the point of entry of said airstream into said duct and the point of its impingement against said filter.

4. A structure according to claim 1, wherein said filter has a concave lower surface and is parabolic in cross-section.

References Cited by the Examiner

UNITED STATES PATENTS

| 2,459,194 | 1/1949 | Sparklin | 15—352 |
| 3,003,178 | 10/1961 | McEachern | 15—312.1 |
| 3,080,598 | 3/1963 | McEachern | 15—312.1 |

FOREIGN PATENTS

| 227,138 | 3/1960 | Australia. |

ROBERT W. MICHELL, *Primary Examiner.*

WALTER A. SCHEEL, *Examiner.*